United States Patent

Taniguchi

[11] Patent Number: 5,991,428
[45] Date of Patent: Nov. 23, 1999

[54] MOVING OBJECT DETECTION APPARATUS AND METHOD

[75] Inventor: Yasuhiro Taniguchi, Osaka-fu, Japan

[73] Assignee: Kabushiki Kaisha Toshiba, Kawasaki, Japan

[21] Appl. No.: 08/912,172

[22] Filed: Aug. 15, 1997

[30] Foreign Application Priority Data

Sep. 12, 1996 [JP] Japan ................................... 8-241904

[51] Int. Cl.$^6$ .............................. G06K 9/00; G06T 7/20
[52] U.S. Cl. ...................... 382/107; 348/155; 348/417; 348/699; 382/173
[58] Field of Search ..................................... 382/107, 232, 382/236, 103, 130, 153, 154, 171–172, 173, 291; 345/113, 114; 348/586, 154, 155–220, 208, 413, 416, 699–700; 396/3; 704/260; 352/53, 87; 368/229

[56] References Cited

U.S. PATENT DOCUMENTS

| | | | |
|---|---|---|---|
| 4,645,459 | 2/1987 | Graf et al. | 434/43 |
| 4,841,575 | 6/1989 | Welsh et al. | 704/260 |
| 4,937,878 | 6/1990 | Lo et al. | 382/103 |
| 5,111,511 | 5/1992 | Ishii et al. | 382/107 |
| 5,122,873 | 6/1992 | Golin | 348/390 |
| 5,157,732 | 10/1992 | Ishii et al. | 382/107 |
| 5,206,723 | 4/1993 | Parke | 348/416 |
| 5,243,418 | 9/1993 | Kuno et al. | 348/155 |
| 5,307,170 | 4/1994 | Itsumi et al. | 348/219 |
| 5,526,044 | 6/1996 | Tokumitsu et al. | 348/208 |
| 5,550,591 | 8/1996 | Rim et al. | 348/413 |
| 5,701,163 | 12/1997 | Richards et al. | 348/578 |
| 5,729,302 | 3/1998 | Yamauchi | 348/699 |
| 5,748,775 | 5/1998 | Tsuchikawa et al. | 382/190 |
| 5,764,786 | 6/1998 | Kuwashima et al. | 382/107 |
| 5,777,690 | 7/1998 | Takeda et al. | 348/699 |
| 5,838,365 | 11/1998 | Sawasaki et al. | 348/169 |

OTHER PUBLICATIONS

Don Murray et al., "Motion Tracking with an Active Camera", IEEE Transactions on Pattern Analysis and Machine Intelligence, vol. 16, No. 5, May 1994, pp. 449–459.

Satoshi Terakubo, et al. "Motion Detection from Image Sequences with a Moving Camera", Proc. of Joho shori gakkai No. 51, Nara Institute of Science and Technology (NAIST), 1995, pp. 2–237–2–238.

*Primary Examiner*—Jon Chang
*Assistant Examiner*—Jayanti K. Patel
*Attorney, Agent, or Firm*—Finnegan, Henderson, Farabow, Garrett & Dunner, L.L.P.

[57] ABSTRACT

A moving object detection apparatus includes a movable input section to input a plurality of images in a time series, in which a background area and a moving object are included. A calculation section divides each input image by unit of predetermined area, and calculates the moving vector between two images in a time series and a corresponding confidence value of the moving vector by unit of the predetermined area. A background area detection section detects a group of the predetermined areas, each of which moves almost equally as the background area from the input image according to the moving vector and the confidence value by unit of the predetermined area. A moving area detection section detects the area other than the background area as the moving area from the input image according to the moving vector of the background area.

10 Claims, 13 Drawing Sheets

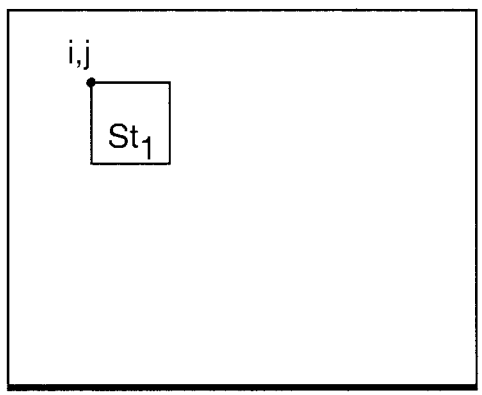
IMAGE (t)
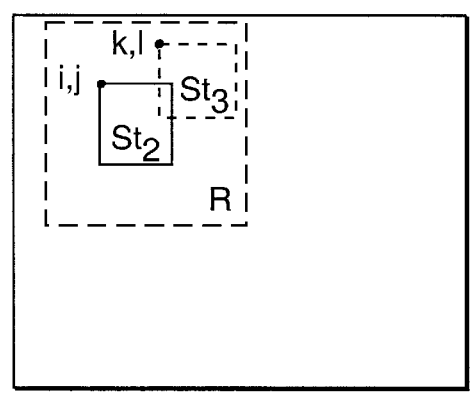
IMAGE (t+1)
FIG. 7A  FIG. 7B

DISTRIBUTION α ON THE AREA R

MOVING VECTOR SPACE Sm

MOVING OBJECT DETECTION APPARATUS AND METHOD

FIELD OF THE INVENTION

The present invention relates to a moving object detection apparatus and a method for correctly detecting the moving object from an image inputted by a movable camera in time series.

BACKGROUND OF THE INVENTION

Several methods are available to detect a moving object from the image inputted by a TV camera. The moving object is, for example, a car or a plane which is moving in a background. When the moving object and the background are taken by the TV camera, the method to detect the moving object from the image is as follows.

(1) "Motion Tracking with an Active Camera" D. Murray, A. Basu (PAMI, Vol. 16, No 5, 449–459, 1994). In this method, the movement amount of the camera is previously known. The correspondence of the moving object in image sequences is calculated. In short, by using the movement amount of the camera, the movement of the object is predicted in the images.

(2) A plurality of characteristic points are set in plural images. The apparatus searches in the plural images for an area whose peak points correspond to the characteristic points. In this way, Affine transformation parameters between the plural images are calculated. By using the Affine transformation parameters, the background is shifted between the plural images to detect the moving object.

(3) In Japanese Patent Disclosure (Kokai) PH7-110864, a two dimensional Laplacian filter is multiplied with a moving vector field in the image. By using the output value, a group of background vectors is separated from a group of moving object vectors in the image to detect the moving object.

In the above-mentioned methods, the uncertainty of the movement amount in the image is not taken into consideration; nor is the reliability of the determination of the moving vector by scene including the background.

When the object moving in the background is taken by the camera, it is necessary that the area of the image be divided into a background and a moving object. In this case, the background is separated from the moving object according to the moving vector of each area in the image. However, as mentioned-above, the moving vector of the image calculated by the prior method is uncertain. Therefore, if this kind of moving vector is used uniformly, it often happens that the background is not correctly separated from the moving object. Even if the uncertainty of the moving vector is taken into consideration according to situation of the scene as a whole, it is difficult to correctly detect the moving object reflected in the situation of the scene. This problem occurs in cases where moving, rather than stationary, cameras are used.

SUMMARY OF THE INVENTION

It is an object of the present invention to provide a moving object detection apparatus which is able to correctly detect a moving object from an input image even when the image input device is moving.

According to the present invention, there is provided a moving object detection apparatus, comprising: a movable image input means for inputting a plurality of images including a background and a moving object in time series; a calculation means for dividing each input image by a unit of predetermined area, and for calculating the moving vector between two images in time series and a corresponding confidence value (i.e., the degree of confidence that the moving vector detected is corrected) of the moving vector by unit of the predetermined area; a background area detection means for detecting a group of the predetermined areas, each of which moves almost equally as the background area from the input image according to the moving vector and the corresponding confidence value by unit of the predetermined area; and moving area detection means for detecting the area other than the background area as the moving area from the input image according to the moving vector of the background area.

Further in accordance with the present invention, there is also provided a method for detecting a moving object, comprising the steps of: inputting a plurality of images including a background and a moving object in time series; dividing each input image by unit of predetermined area; calculating a moving vector between two input images in time series and a confidence value of the moving vector by unit of the predetermined area; detecting a group of the predetermined areas, each of which moves almost equally as the background area from the input image according to the moving vector and the corresponding confidence value by unit of the predetermined area; and detecting an area other than the background area as the moving area from the input image according to the moving vector of the background area.

Further in accordance with the present invention, there is also provided a computer-readable memory containing computer readable instructions, comprising: an instruction means for causing a computer to input a plurality of images including a background and a moving object in time; an instruction means for causing a computer to divide each input image by unit of predetermined area; an instruction means for causing a computer to calculate a moving vector between two input images in time and a corresponding confidence value of the moving vector by unit of the predetermined area; an instruction means for causing a computer to detect a group of the predetermined areas each of which moves almost equally as the background area from the input image according to the moving vector and the confidence degree by unit of the predetermined area; and an instruction means for causing a computer to detect an area other than the background area as the moving area from the input image according to the moving vector of the background area.

BRIEF DESCRIPTION OF THE DRAWINGS

FIGS. 7A and 7B are schematic diagrams of areas to search for a correspondence of divided areas among time series images according to the present invention.

DETAILED DESCRIPTION OF THE PREFERRED EMBODIMENT

Figure 1:
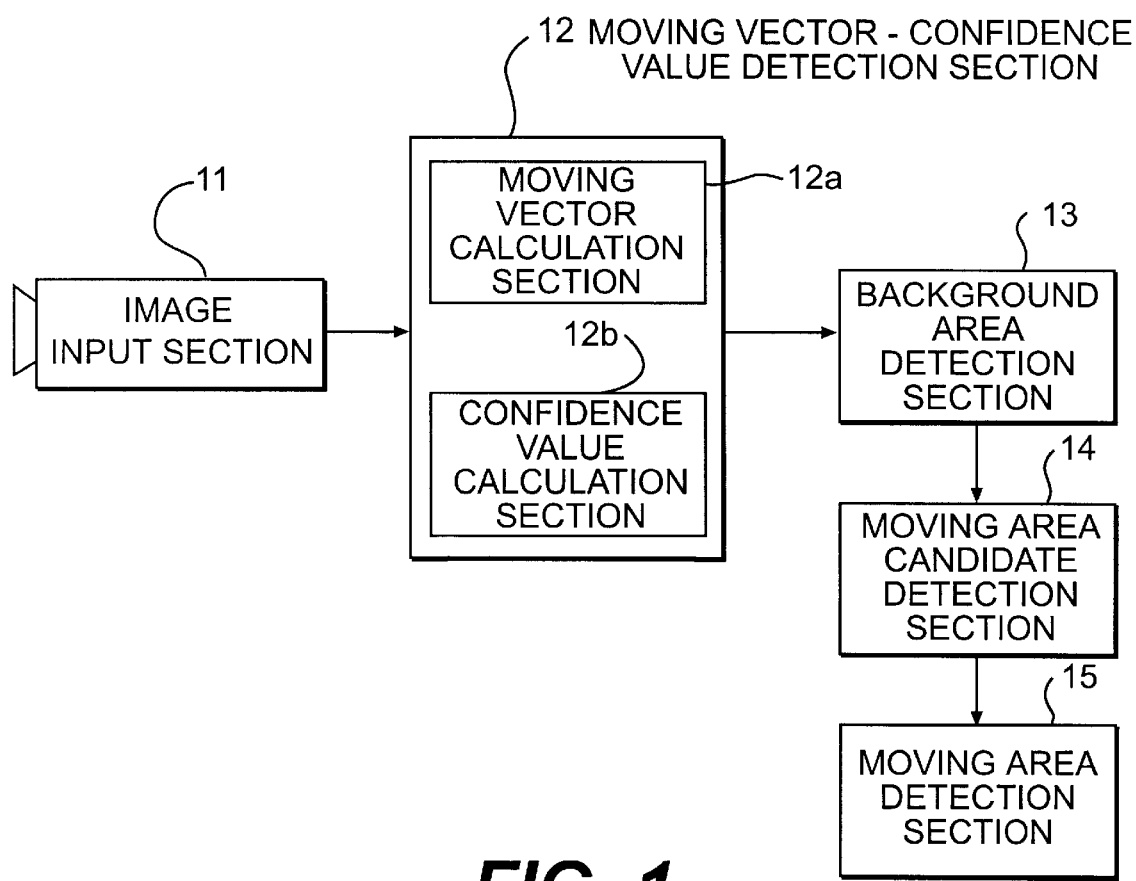
FIG. 1 is a block diagram of the moving object detection apparatus according to a first embodiment of the present invention.

FIG. 1 is a block diagram of the moving object detection apparatus according to an embodiment of the present invention. As shown in FIG. 1, the moving object detection apparatus is comprised of an image input section 11, a moving vector-confidence value detection section 12, a background area detection section 13, a moving area candidate detection section 14 and a moving area detection section 15. The movable image input section 11 inputs a plurality of images including a background and a moving object in a time series. The plurality of images is supplied to the moving vector-confidence value detection section 12. The moving vector-confidence value detection section 12 consists of a moving vector calculation section 12a and a confidence value calculation section 12b. The moving vector calculation section 12a divides the image into a plurality of predetermined areas and calculates the moving vector (moving information) between two images by a unit of predetermined area. The confidence value calculation section 12b calculates the corresponding confidence value of the moving vector by a unit of predetermined area. The moving vector and the confidence value are supplied to the background area detection section 13. The background area detection section 13 detects a group of predetermined areas, each of which moves equally as the background area from the image according to the moving vector and the confidence value. The moving vector of the background is supplied to the moving area candidate detection section 14. The moving area candidate detection section 14 and the moving area detection section 15 detect the area other than the background area as the moving object area according to the moving vector of the background area. The moving area candidate detection section 14 shifts the next image (or a previous image) for the input image according to the moving vector of the background and extracts the difference between the shifted image and the input image to detect a candidate moving area. The moving area detection section 15 shifts the previous image (or the next image) to detect the moving area only.

In this case, the image input section 11 is, for example, a moving camera (TV camera equipped on the car) which orderly inputs the image for the moving object. If the moving parameter of the camera is previously known, it is possible to detect the moving area by transforming the image according to the move parameter. However, in the present invention, even if the moving parameter of the camera is not previously known, the moving area is correctly detected from the image.

The moving object may be a car, a bicycle, a human, a plane, or a fixed object such as a billboard located on road side. A special color or mark does not have to be attached to these objects.

Figure 2A:
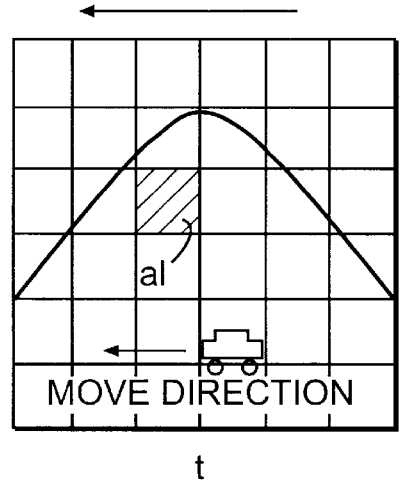
FIGS. 2A, 2B, and 2C are schematic diagrams showing detection of the moving object according to the present invention.
Figure 2B:
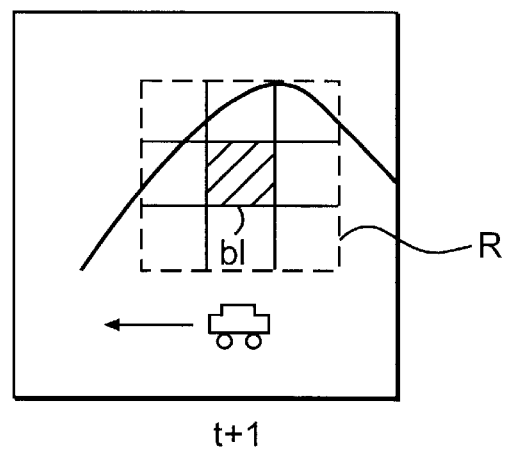
Figure 2C:
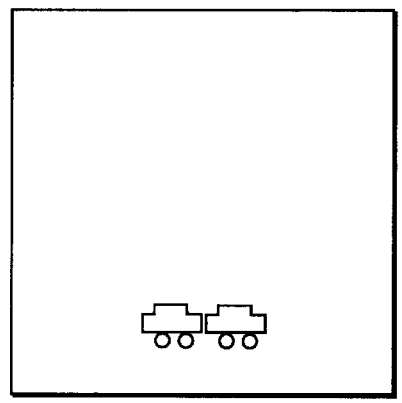

Next, the processing of the moving object detection method of the present invention will be explained in detail. FIGS. 2A, 2B, 2C are schematic diagrams showing processing of the moving object detection method according to the present invention. Assume that the car is the moving object the mountain is the background object, the image that includes the car and mountain is inputted using a moving camera. FIG. 2A shows the first image inputted at timing (t). FIG. 2B shows a second image inputted at timing (t+1). These images are inputted by the image input section 11 in time sequence. It is necessary that this image be divided into a background area and a moving area. In this case, if the camera is also moving, both the background area and the moving area are moving in the image according to movement of the camera. Therefore, moving area be correctly separated from the background area by taking into consideration the corresponding confidence value of the moving vector.

First, as shown in FIG. 2A, the input image (t) is divided into a plurality of blocks (predetermined areas). Each block is matched to search for the corresponding block of the next input image (t+1) shown in FIG. 2B according to the difference of the characteristic amount between the image (t) and the next image (t+1). If the characteristic amount is the density of a pixel, a block of the image (t+1) in which the difference of the density of a pixel is minimal when compared to the block of the image (t) will be the corresponding block of the image (t+1). For example, as for block "a1" of the image (t) in FIG. 2A, the block "a1" is orderly shifted onto area R of the image (t+1) in FIG. 2B by a unit of one pixel. If the difference of the densities of pixels between the block "a1" and a block "b1" is minimum, block "b1" is determined to correspond to the block "a1". Next, the distance between the block "b1" of the image (t+1) and the corresponding block is calculated as the moving vector. In FIGS. 2A and 2B, the relative position of the block "a1" on the area R is calculated and a distance between the relative positions of the block "a1" and the block "b1" is measured on the area R. In this way, as for each block of the image (t), a corresponding block of the image (t+1) is respectively determined and the moving vector between each block of the image (t) and the corresponding block of the image (t+1) is calculated. However, it often happens that the corresponding block of the image (t+1) is not determined. Therefore, in the present invention, as for block "a1", the confidence value of the moving vector of block "b1" is calculated by the distribution of the moving vector of other block in the area R. This processing will be explained in detail afterward.

Next, a group of blocks each of which moves almost equally is detected as the background area. In FIGS. 2A and 2B, a mountain area is detected as the background area. After the moving vector of the background area is calculated, the image (t+1) is shifted as the moving vector of the background area. The shifted image (t+1) is subtracted from the image (t) as shown in FIG. 2C. In this case, the moving area candidate is detected because the background area of the shifted image (t+1) overlaps the background area of the image (t). In this case, the moving area candidate includes two moving areas partially connected as shown in FIG. 2C. Therefore, in order to extract the moving area correctly, it is necessary to determine the moving area using another input image (t−1). This processing will be explained in detail afterward.

Next, each processing of the specific feature of the first embodiment is explained.

(a) Processing of detection of the moving vector and the confidence value

Figure 3A:
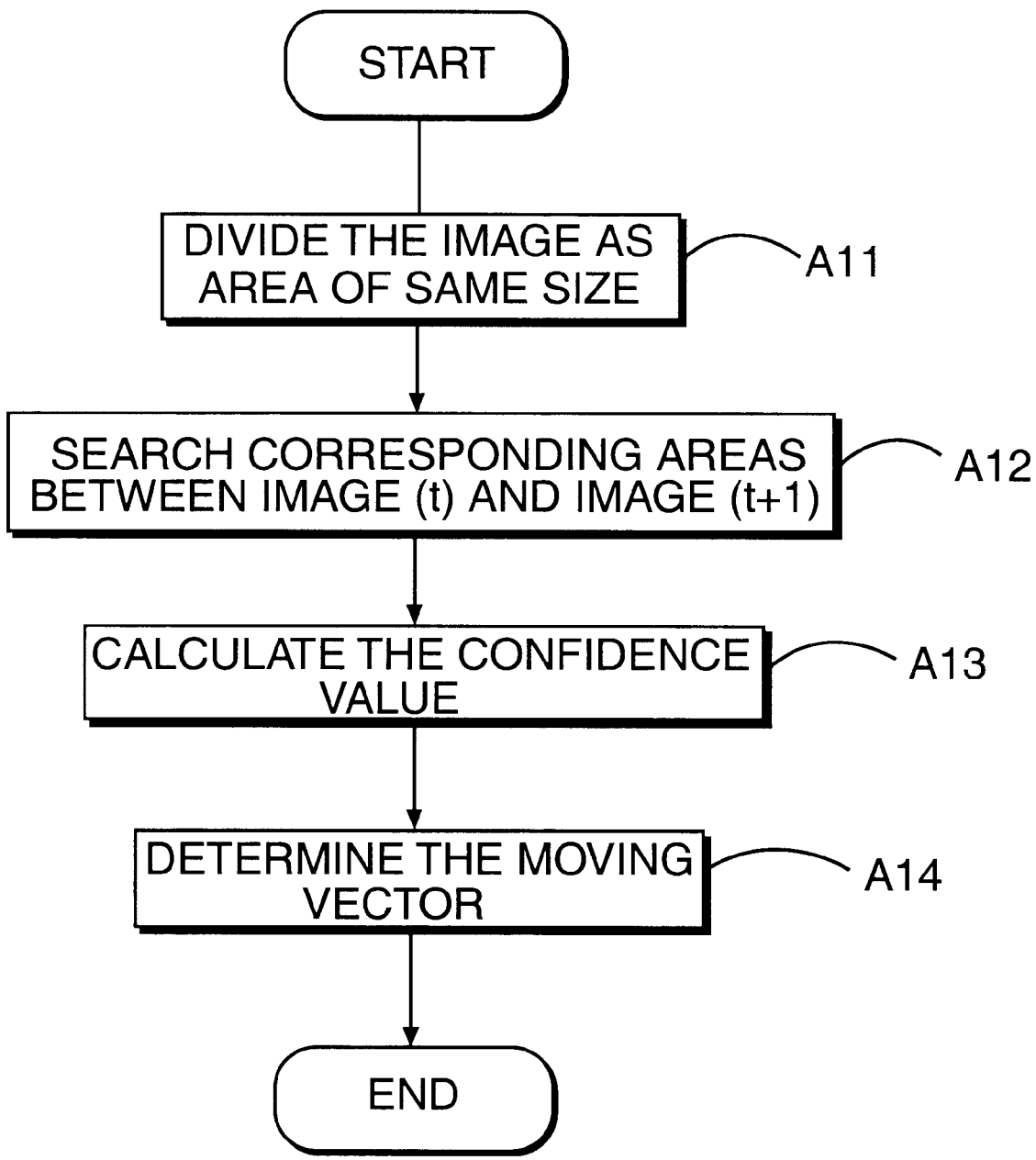
FIGS. 3A, 3B, and 3C are flow charts of processing of a moving vector-confidence value detection section according to the present invention.

As mentioned-above, the moving vector-confidence value detection section 12 inputs the plurality of images in a time series from the image input section 11, calculates the moving vector between two images by unit of the block by image-processing and supplies the moving vector with the confidence value to the background area detection section 13. In this case, the moving vector and the confidence value are calculated using several methods shown in FIGS. 3A, 3B, 3C. FIG. 3A is a flow chart of the processing of the area method. First, the image is divided into a plurality of blocks as shown in FIG. 2A (step A11). As for each block of the image (t), a corresponding block is searched on area R of the image (t+1), and the moving vector between the block of the image (t) and the corresponding block of the image (t+1) is calculated as shown in FIGS. 7A and 7B. In this case, if the difference between the pixel value of a block of the image (t+1) and the block of the image (t) is minimum, the block of the image (t+1) is determined to be the corresponding block. The corresponding block whose evaluation value is minimum is searched by following an equation (1) (step A12).

$$D(k, l; k, l \in R) \frac{1}{N} \sum_j \sum_i (I_{t1}(i, j) - I_{t2}(i - k, j - 1))^2 \quad (1)$$

In the equation (1), the evaluation value is above 0. This evaluation value is converted to evaluation value $\alpha$ of uncertainty of the moving vector by following equation (2). The block of the image (t+1), in which a sum of absolute value of the pixel value for the block of the image (t) is minimum, may be determined to be the corresponding block.

$$\alpha = \frac{1}{D(k, l; k, l \in R)}; D(k, l; k, l \in R) > \frac{1}{\alpha_{max}} = \alpha_{max}; \text{else} \quad (2)$$

Figure 8:
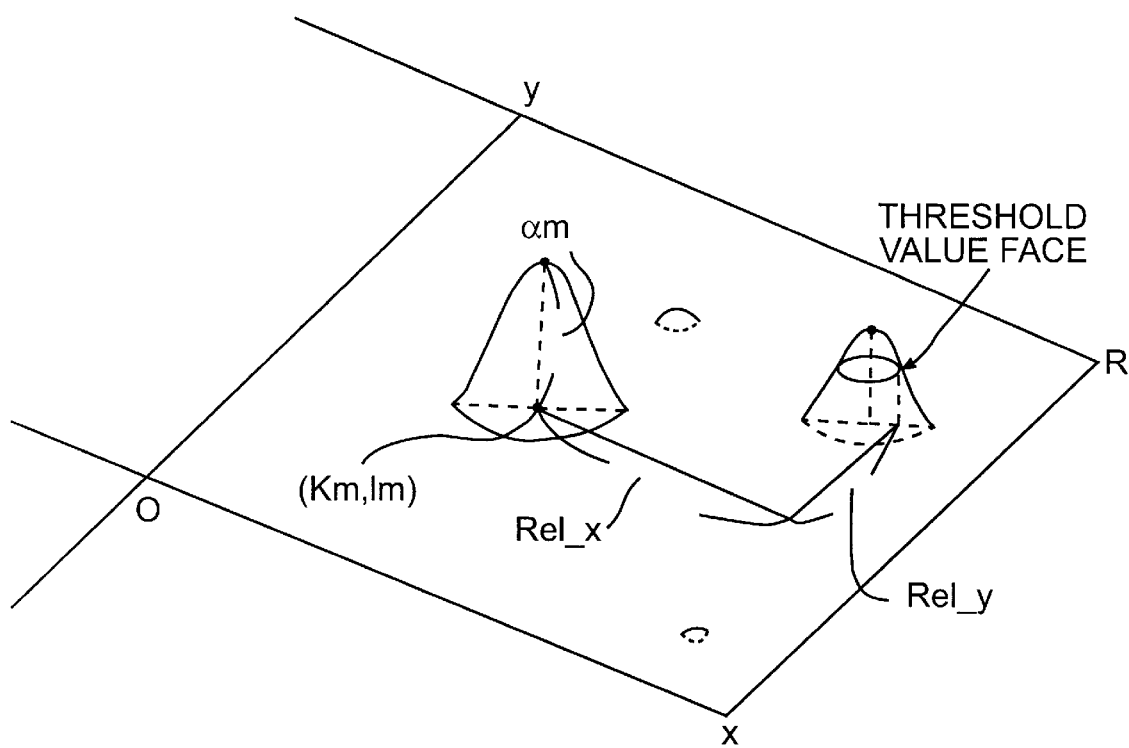
FIG. 8 is a schematic diagram of the distribution of estimated value α of the moving vector on the search area R according to the present invention.

Next, the confidence value of the moving vector is calculated according to the moving vector and the evaluation value $\alpha$ (step A13). FIG. 8 is a schematic diagram of the distribution of the evaluation value $\alpha$ in the area R. In FIG. 8, the position (km, lm) of the block whose evaluation value $\alpha$ is maximum am represents the moving vector of the block (step A14). In FIGS. 7A and 7B, as for the block (st1) whose position is (i, j) on the image (t), assume that the block (st2) is in the same position (i, j) on the image (t+1), and that the block (st3) whose position is (k, 1) is determined to correspond to the block (st1) of the image (t). In this case, the position (i, j) of the block (st2) in FIG. 7B corresponds to the origin O of the area R in FIG. 8. The position (k, l) of the block (st3) in FIG. 7B corresponds to the position (km, lm) of the area R in FIG. 8. Accordingly, the position (km, lm) of the area R in FIG. 8 represents the moving vector between the block (st2) and the block (st3) in FIG. 7B. Next, a threshold is determined according to the evaluation value αm, and the other block whose evaluation value is above the threshold is searched in the area R. As shown in FIG. 8, the distance from the position (km, lm) to the other block along X axis and Y axis is measured. This distance (Relx, Rely) is the confidence value of the moving vector (km, lm). The confidence value represents the reliability of the moving vector of the evaluation value αm. It is possible that the corresponding confidence value of the moving vector is represented along X axis and Y axis as a deviation (Relx, Rely). In case of simply representing the confidence value, the maximum distance from the position (km, lm) to the other block whose evaluation value is above the threshold is used as the confidence value.

The above-mentioned processing in FIG. 8 is repeated for each block in the image (t). In this way, the moving vector and the confidence value of all blocks are respectively determined.

Figure 3B:
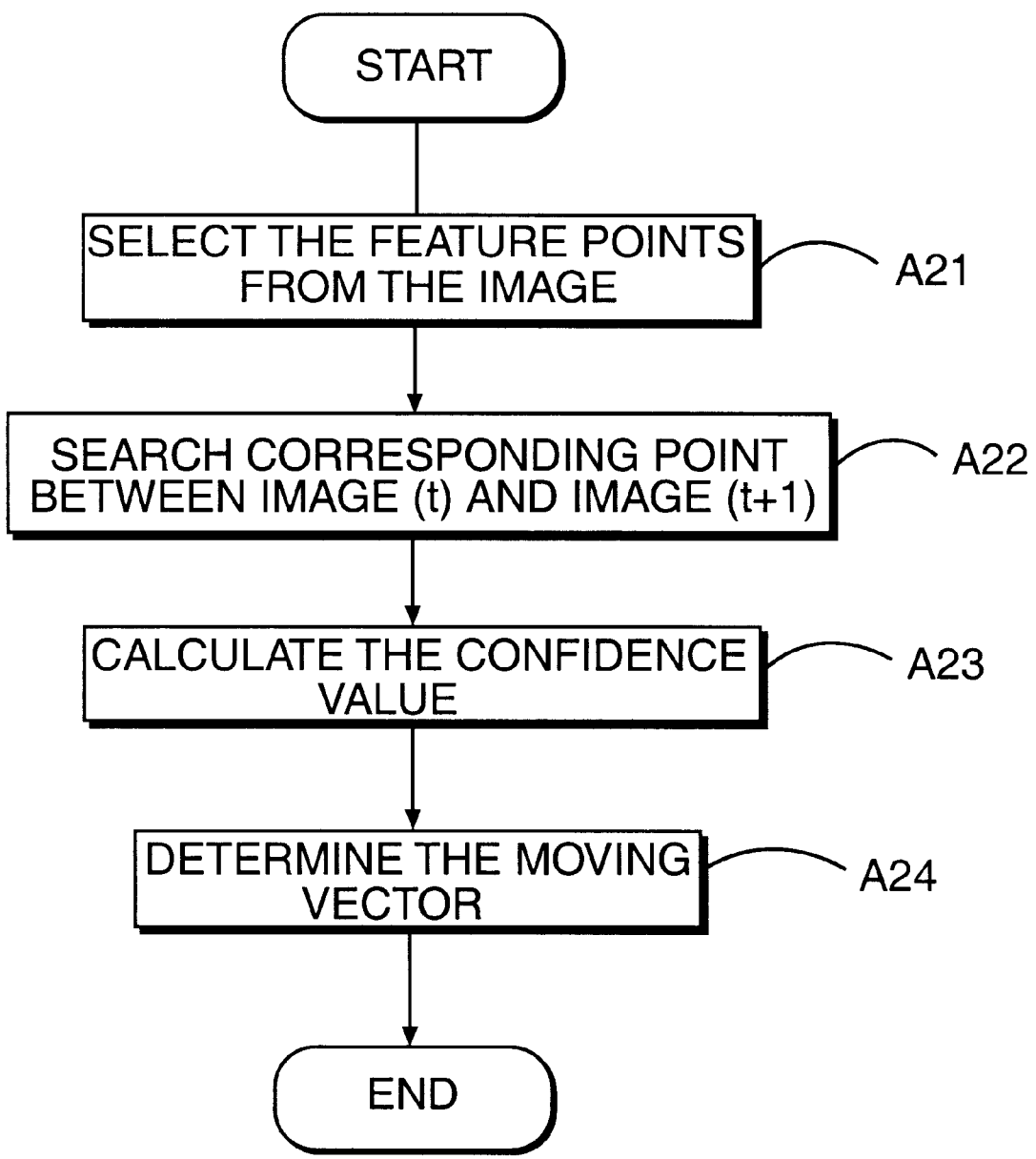

FIG. 3B is a flow chart of the processing of the feature point method according to the present invention. In this method, instead of analyzing the correspondence of the blocks, the feature points whose 1st or 2nd differential calculus value is large are extracted from the image (t) and the image (t+1) (step A21). Correspondence between the feature point of the image (t) and the feature point of the image (t+1) is determined (step A22). The evaluation value D of correspondence of the feature point is calculated by the differential calculus value between the image (t) and the image (t+1). In the same way as the area method, a corresponding point is searched in area R of the image (t+1) and the evaluation value $\alpha$ is calculated (step A23). The moving vector is determined according to the evaluation value $\alpha$ (step A24).

Figure 3C:
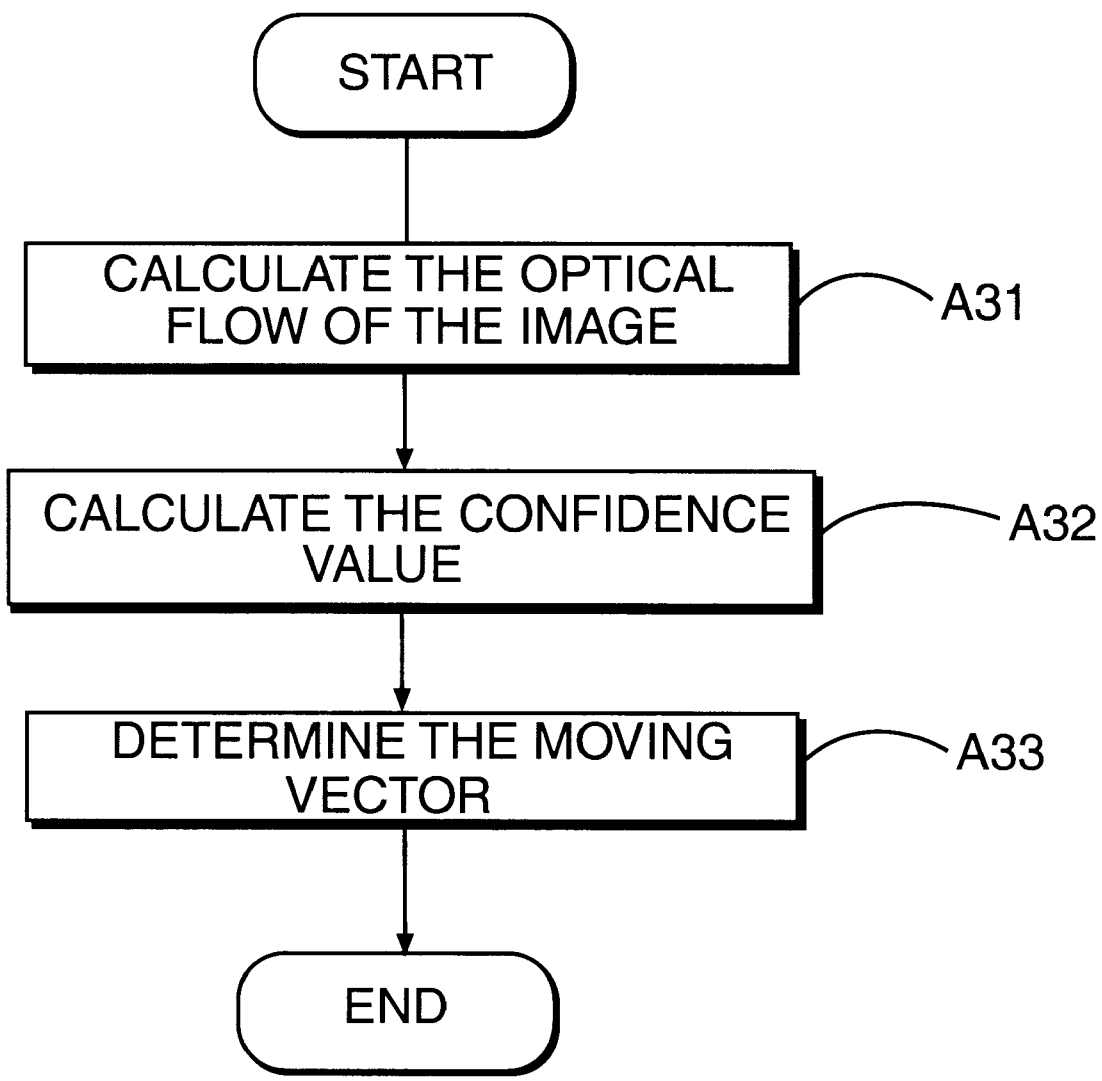

FIG. 3C is a flow chart of the processing of the optical flow method according to the present invention. In this method, the optical flow of each pixel between the image (t) and the image (t+1) is calculated by a gradient method (step A31). The evaluation value $\alpha$ is calculated by the optical flows in the area R of the image (t+1) (step A32), and the moving vector is determined according to the evaluation value $\alpha$ (step A33).

In case the information of the background or the moving object is previously known, a simple method is used. For example, if the moving object is located in front of a background of monotone color, a memory to store color information of the background is prepared. The area whose color is same as the stored color is extracted as the background area. In case of a monotone color of the moving object, a memory to store color information of the moving object is prepared. The area whose color is different from the stored color is extracted as the background area. The confidence value of the extracted area is the difference between the characteristic properties of the image such as color or brightness of the background area and the moving object area.

(b) Processing of detection of the background area

Figure 4:
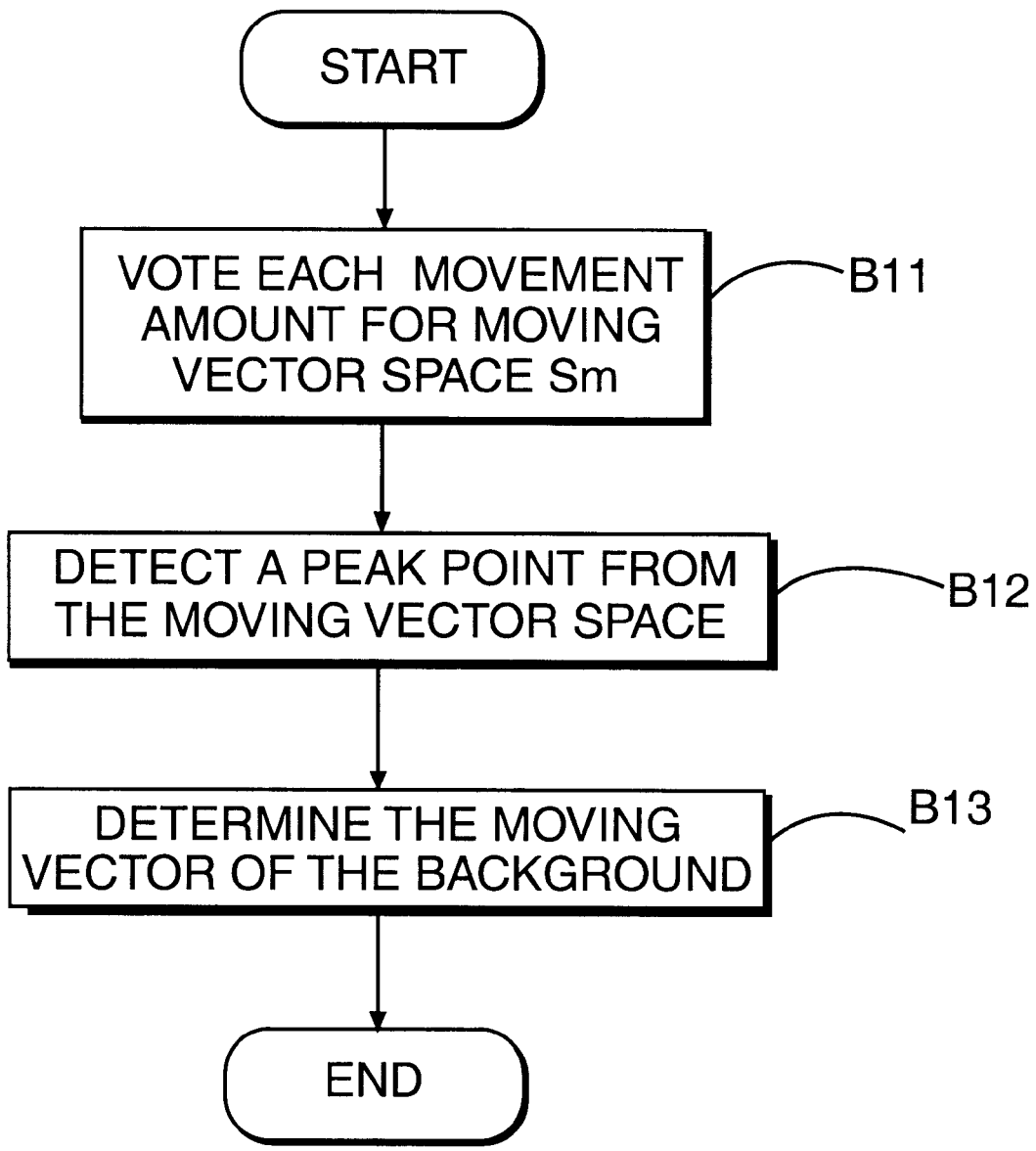
FIG. 4 is a flow chart of processing of a background area detection section according to the present invention.
Figure 9:
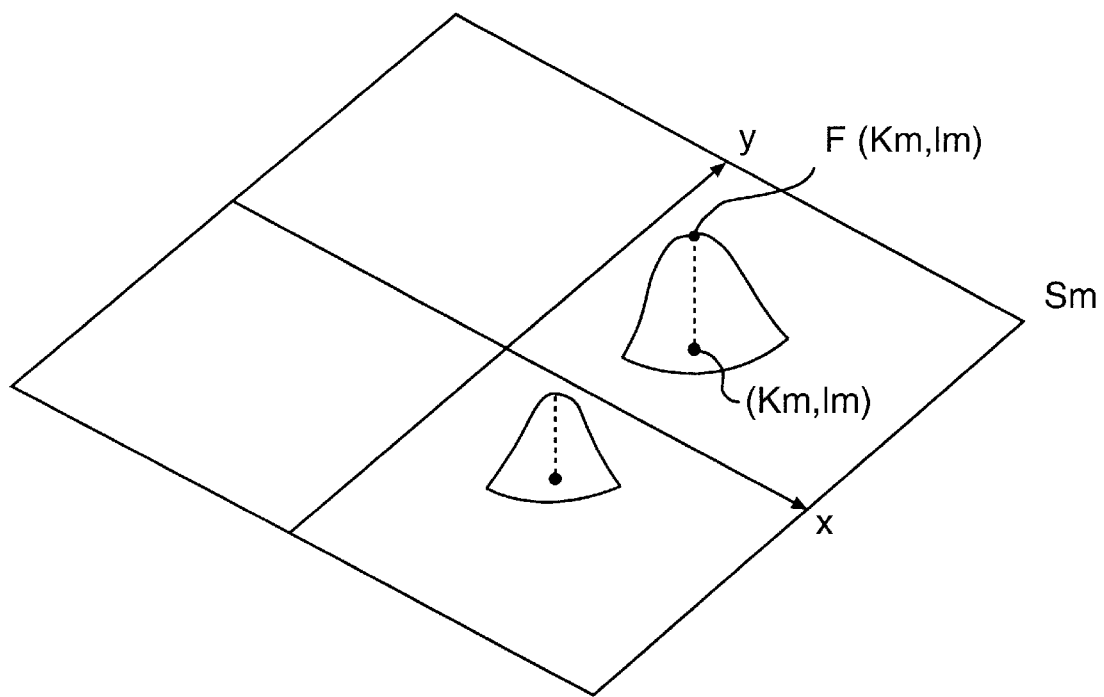
FIG. 9 is a schematic diagram of the coordinate axis of the moving vector space Sm according to the present invention.

The moving vector and the confidence value of each block in the image (t) are supplied to the background area detection section 13. The background area detection section 13 classifies the moving vector of each block according to the confidence value and detects a group of blocks whose moving vector are almost equal to those of the background area. FIG. 4 is a flow chart of the processing of the detection of the background area. In this case, when correspondence of the block in the image (t) and the block in the image (t+1) is determined, the moving vector (km, lm) and the confidence value (Relx, Rely) is detected. Therefore, classification of each block is executed according to the confidence value. If movement of the image is only parallel with the movement of the camera, the moving vector of each block is projected to a moving vector space Sm as shown in FIG. 9 (step B11). In this case, if the confidence value of the moving vector is not taken into consideration, the moving vector of each block is plotted (voted) as one point on the XY plane of the moving vector space Sm. However, in order to take into consideration the confidence value, a value of normal distribution is calculated according to the following equation (3).

$$F(x, y) = \frac{1}{2\pi\sigma_x\sigma_y}\exp\left\{-\frac{1}{2}\left(\frac{x^2}{\sigma_x^2} + \frac{y^2}{\sigma_y^2}\right)\right\} \quad (3)$$

$$(\sigma_x, \sigma_y) = (Relx, Rely)$$

$$(x, y) = (km, lm)$$

As shown in FIG. 9, F(x, y) is plotted (voted) along a direction perpendicular to the XY plane of the moving vector space Sm. If the confidence value is smaller than a threshold, F(x, y) is not plotted because the moving vector is not confident.

In the above equation (3), F(x, y) may be calculated as "σx=σy". The distribution may be not only the normal distribution, but also the uniform distribution or triangular distribution.

In this way, the moving vector and the normal distribution F(x, y) of all blocks in the image (t) are plotted for the moving vector space Sm. The background area detection section 13 detects the peak point (largest value) of the normal distribution from the moving vector space Sm (step B12). The moving vector corresponding to the peak point is detected as the moving vector of the background area and supplied to the moving area candidate detection section (step B13). In the example of FIG. 9, the normal distribution F(km, lm) is a peak point and the moving vector (km, lm) is detected as the moving vector of the background area.

If the relative movement of the image and the camera is not only parallel but also rotates and zooms, it is necessary to calculate the coefficient of the Affine transformation (equation (4)) by unit of the block.

$$(x', y')=fR(x, y)+T \quad (4)$$

f: coefficient of zoom
R: coefficient matrix of rotation
T: coefficient vector of parallel movement In order to solve equation (4), it is necessary to calculate the coefficient according to the method of least squares. In this case, the coefficient is correctly calculated using the confidence degree as weight. The method of least squares is affected by a large variance. Therefore, the moving vector of the background area is correctly calculated by a convolution method. In this case, if the movement of the background occupies a large part of the image, it is sufficient to calculate only one Affine coefficient for all of the images.

(c) Processing of detecting the moving area candidate

Figure 5:
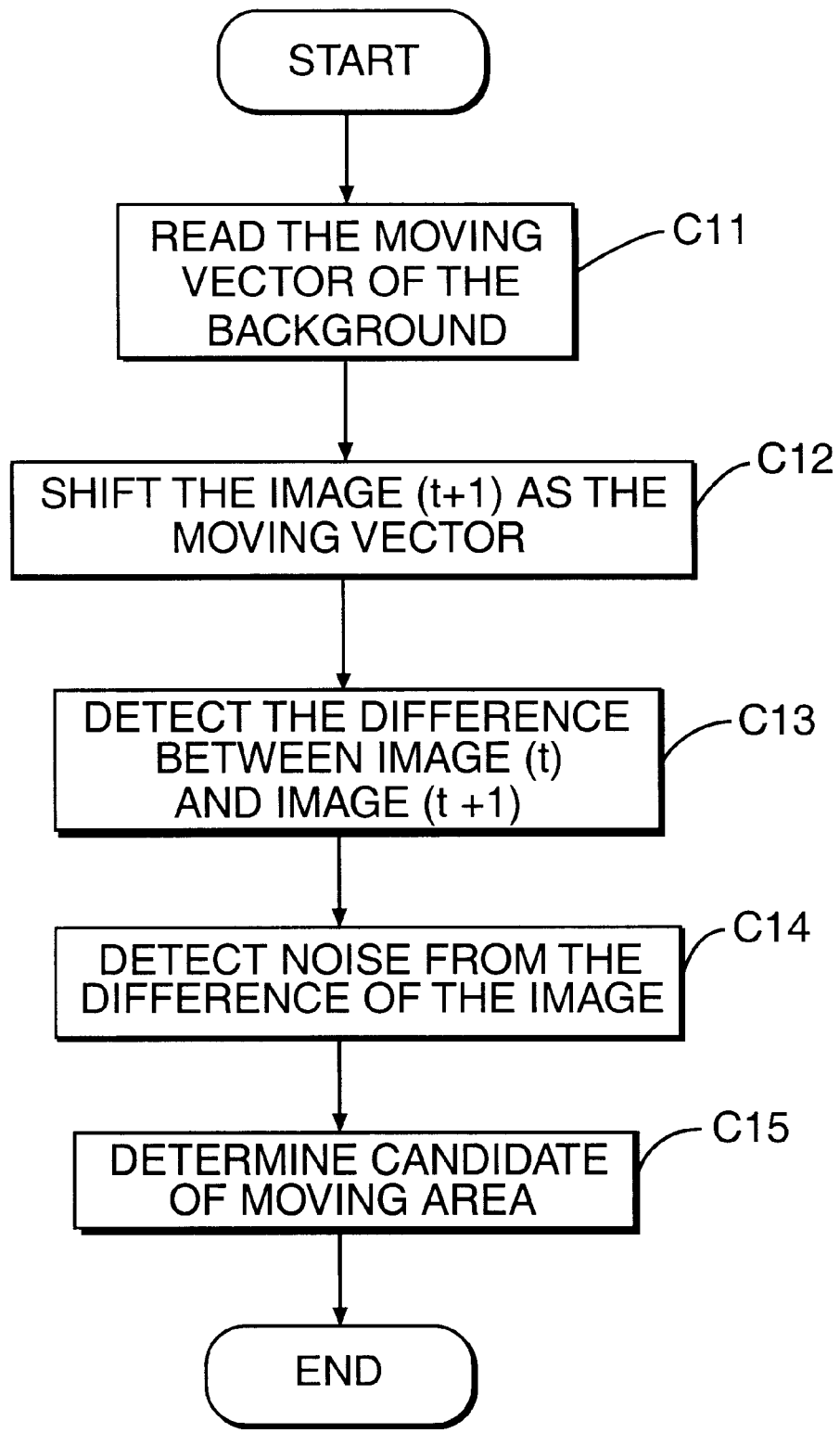
FIG. 5 is a flow chart of processing of a moving area candidate detection section according to the present invention.

FIG. 5 is a flow chart of processing of the moving area candidate detection section 14. The moving area candidate detection section 14 reads the moving vector of the background detected by the background area detection section 13 (step C11) and shifts the image (t+1) as the moving vector (step C12). The difference between the shifted image (t+1) and the image (t) is extracted as the moving area (step C13). At this point, the image (t) may be shifted by the moving vector, and the difference between the shifted image (t) and the image (t+1) is determined. In order to delete noise from overlapped images, the part whose difference value is above a threshold is extracted as a candidate of the move area (step C14, C15).

(d) Processing of detecting the moving area

Figure 6:
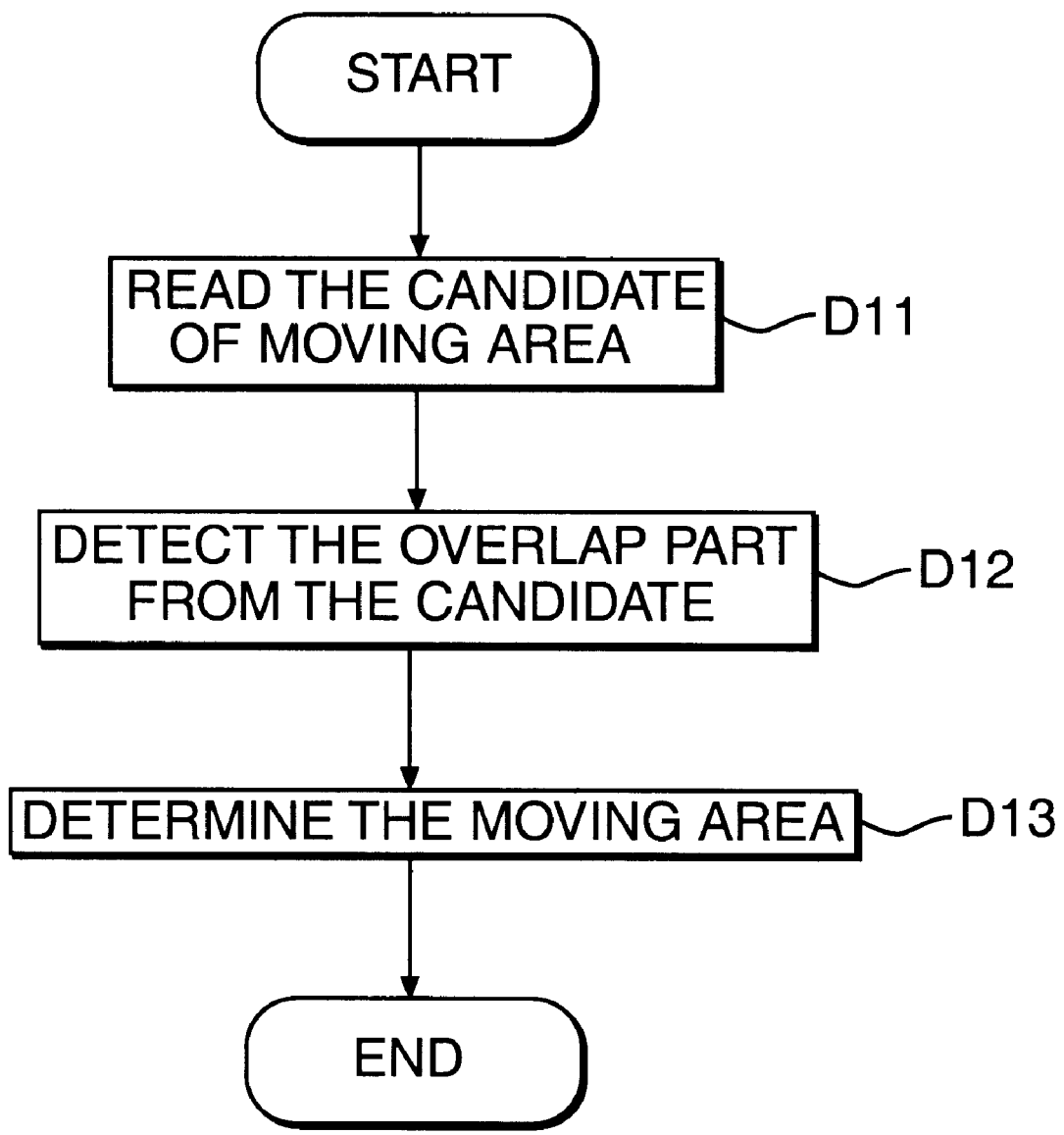
FIG. 6 is a flow chart of processing of a moving area detection section according to the present invention.

The moving area candidate in the subtracted images (t, t+1) is supplied to the moving area detection section 15. FIG. 6 is a flow chart of the processing of the moving area detection section 15. As shown in FIG. 2C, the moving area candidate in the subtracted images is comprised of two overlapped moving areas. Accordingly, the moving area detection section 15 must extract one moving area correctly. The moving area detection section 15 prepares a plurality of memory spaces to respectively store the subtracted images.

During the storing one subtracted image in one memory space, the moving area is detected using other subtracted images stored in another memory space. Furthermore, a plurality of subtracted images are orderly stored in a time series, and the timing for detecting the difference between the subtracted images can be controlled.

The moving area detection section 15 orderly stores the moving area candidate of the subtracted image supplied by the moving area candidate detection section 14 (step D11). Then, the moving area detection section 15 extracts the difference of at least two subtracted images (step D12), and the moving area of the subtracted images is detected (step D13). In this case, two methods to detect the move area are selectively used. In one method, the first subtracted image and second subtracted image are respectively converted to binary form and these converted images are multiplied to detect the moving area. In another method, assume that all pixels of the first subtracted image and second subtracted image are gray value. In this case, the first subtracted image and the second subtracted image are directly multiplied to detect the moving area.

Figure 10:
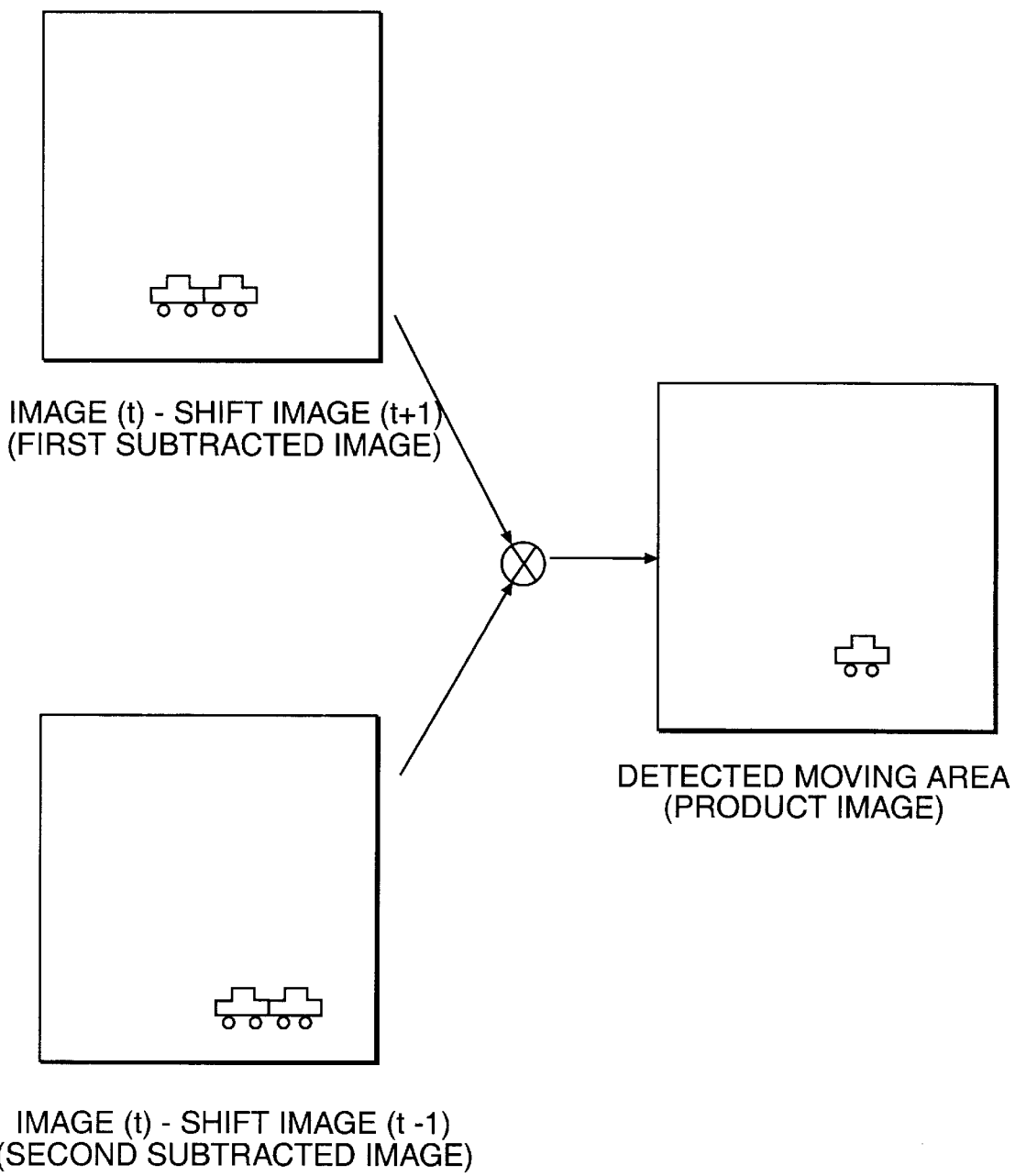
FIG. 10 is a schematic diagram of the moving area detected from the time series images according to the present invention.

FIG. 10 is a schematic diagram of the processing of detecting the moving area according to the above-mentioned method. The first subtracted image is extracted as the difference between the image (t) and the shifted image (t+1). The second subtracted image is extracted as the difference between the image (t) and the image (t−1). Therefore, as shown in FIG. 10, the moving area is only detected as a sum of the first subtracted image and the second subtracted image.

In the present invention, the moving object is detected using the time series images inputted by a camera. In this case, the image is divided into the background area and the move area according to the corresponding confidence value of moving vector for the scene. In other words, the moving vector of the background by camera-motion is correctly calculated without creating uncertainty with regard to the moving vector, and the area of the moving object is correctly detected using the moving vector of the background.

In the case of using a plurality of cameras, the moving area is respectively detected from each camera image. If parallax is present, a distance from camera position to the move area is determined. The moving area and the distance may be sent to an apparatus to use these data.

Figure 11:
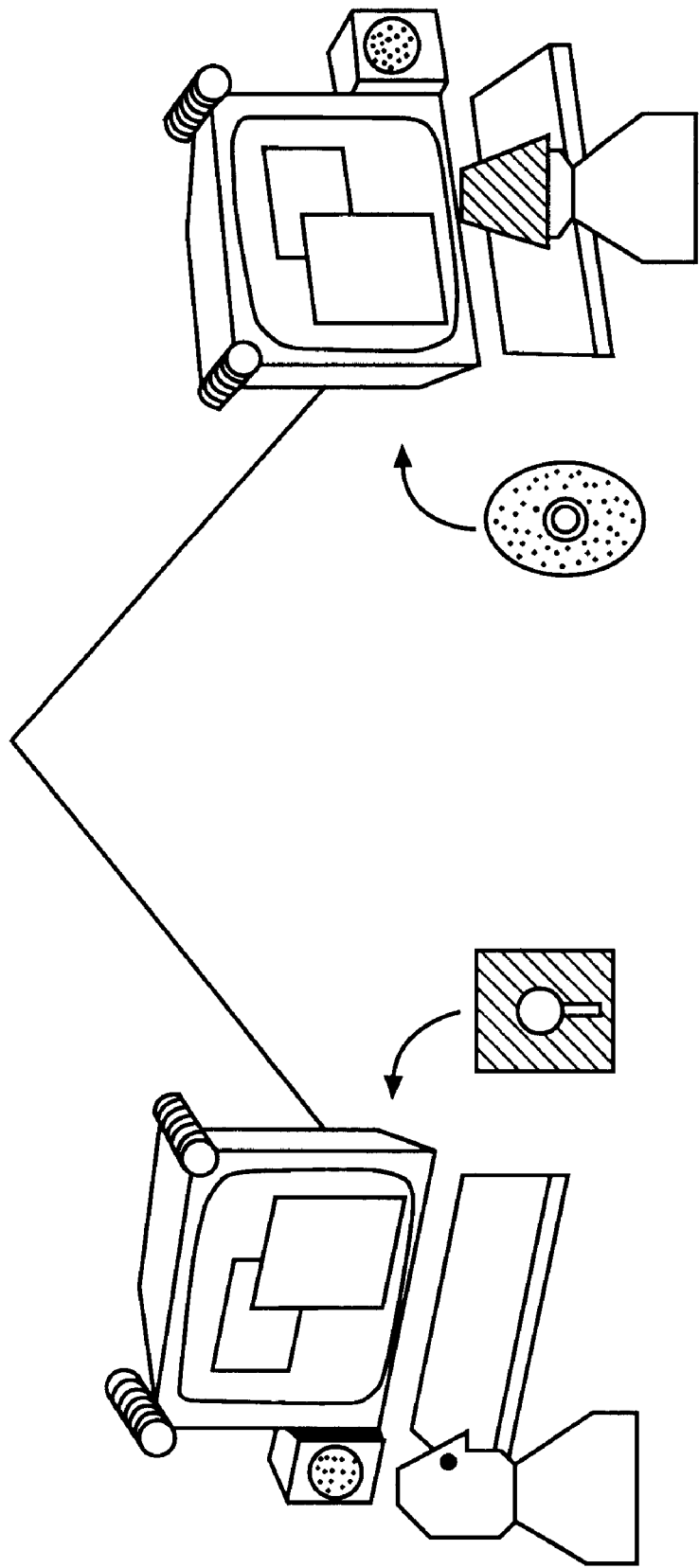
FIG. 11 is a schematic diagram of the supply method for the moving object detection apparatus by software according to the present invention.

FIG. 11 is a schematic diagram of supply method of the moving object detection apparatus by software according to the present invention. In FIG. 11, as a program executed by the computer, the method is stored on a recording media such as a magnetic disk (Floppy Disk, Hard Disk and so on), an optical disk (CD-ROM, DVD and so on), and/or a semiconductor memory in order to apply for various kinds of apparatus. To realize the present invention, the computer reads the program stored in the recording media. Activation of the computer is controlled by program in order to execute the above-mentioned processing.

What is claimed is:

1. A moving object detection apparatus, comprising:
    image input means for inputting a plurality of images including a background and a moving object in time series, wherein said image input means is moving in parallel with movement of the background in the images;

a calculation means for dividing one image into units of predetermined area, for calculating an evaluation value between the predetermined area of the one image and each neighboring area of nex image, for calculating a moving vector between the predetermined area of the one image and corresponding area of the next image, the evaluation value of the corresponding area is maximum among the evaluation values of the each neighboring area of the next image, and for calculating a confidence value of the moving vector for each unit of predetermined area on the one image, the confidence value is a distance between the corresponding area and the neighboring area whose evaluation value is above a threshold based on the maximum on the next image;

a background area detection means for calculating a value of normal distribution using the moving vector and the confidence value for each unit of predetermined area on the one image, for adding the value of normal distribution to a position of the moving vector on a moving vector space for each unit of predetermined area on the one image, and for detecting one moving vector whose value of normal distribution is maximum on the moving vector space as a moving vector of the background area; and a moving area detection means for shifting the next image as the one moving vector, and for subtracting the shifted image from the one image to detect the moving area.

2. The moving object detection apparatus according to claim 1, wherein said calculation means matches the predetermined area of one image with the predetermined area of the next image by shifting as one pixel unit, calculates the difference of pixel values between the predetermined area of the one image and each matched area of the next image, and calculates an evaluation value of the difference of the pixel value.

3. The moving object detection apparatus according to claim 2, wherein said calculation means selects a maximum of the evaluation value as a pair of the predetermined area of the one image and corresponding area of the next image, and calculates a confidence value of the maximum of the evaluation value using the evaluation value between the predetermined area of the one image and a non-corresponding area of the next image.

4. The moving object detection apparatus according to claim 3, wherein said calculation means calculates a relative position between the predetermined area of the one image and the corresponding area of the next image as the moving vector, and calculates a value of normal distribution using the relative position and the confidence degree.

5. The moving object detection apparatus according to claim 4, wherein said background area detection means evaluates the moving vector and the value of normal distribution of each predetermined area of the one image for a moving vector space, and detects one moving vector whose value of normal distribution is maximum from voted result on the moving vector space.

6. The moving object detection apparatus according to claim 5, wherein said move area detection means shifts the next image as the one moving vector detected by said background area detection means, and subtracts the one image from the shifted next image to detect first overlap part of the moving area.

7. The moving object detection apparatus according to claim 6, wherein said moving area detection means shifts the previous image as the one moving vector detected by said background area detection means, and subtracts the one image from shifted previous image to detect second overlap part of the move area.

8. The moving object detection apparatus according to claim 7, wherein said moving area detection means produces the first overlap part and the second overlap part to detect the moving area from the one image.

9. A method for detecting a moving object, comprising the steps of:

inputting a plurality of images including a background and a moving object in time series to an image input section, wherein the image input section is moving in parallel with movement of the background in the images;

dividing one image into units of predetermined area;

calculating an evaluation value between the predetermined area of the one image and calculating an evaluation value between the predetermined area of the one image and each neighboring area of next image;

calculating a moving vector between the predetermined area of the one image and corresponding area of the next image, the evaluation value of the corresponding area is maximum among the evaluation value of the each neighboring area of the next image;

calculating a confidence value of the moving vector for each unit of predetermined area on the one image, the confidence value is a distance between the corresponding area and the neighboring area whose evaluation value is above a threshold based on the maximum on the next image;

calculating a value of normal distribution using the moving vector and the confidence value for each unit of predetermined area on the one image;

adding the value of normal distribution to a position of the moving vector on a moving vector space for each unit of predetermined area on the one image;

detecting one moving vector whose value of normal distribution is maximum on the moving vector space as a moving vector of the background area;

shifting the next image as the one moving vector; and subtracting the shifted image from the one image to detect the moving area.

10. A computer readable memory containing computer readable instructions, comprising:

an instruction means for causing a computer to receive a plurality of images including a background and a moving object in time series by an image input section, wherein the image input section is moving in parallel with movement of the background in the images;

an instruction means for causing a computer to divide one image into units of predetermined area;

an instruction means for causing a computer to calculate an evaluation value between the predetermined area of the one image and each neighboring area of next image;

an instruction means for causing a computer to calculate a moving vector between the predetermined area of the one image and corresponding area of the next image, the evaluation value of the corresponding area is maximum among the evaluation values of the each neighboring area of the next image;

an instruction means for causing a computer to calculate a confidence value of the moving vector for each unit of predetermined area on the one image, the confidence value is a distance between the corresponding area and the neighboring area whose evaluation value is above a threshold based on the maximum on the next image;

an instruction means for causing a computer to calculate a value of normal distribution using the moving vector and the confidence value for each unit of predetermined area on the one image;

an instruction means for causing a computer to add the value of normal distribution to a position of the moving vector on a moving vector space for each unit of predetermined area on the one image;

an instruction means for causing a computer to detect one moving vector whose value of normal distribution is maximum on the moving vector space as a moving vector of the background area;

an instruction means for causing a computer to shift the next image as the one moving vector; and an instruction means for causing a computer to subtract the shifted image from the one image to detect the moving area.

* * * * *

UNITED STATES PATENT AND TRADEMARK OFFICE
CERTIFICATE OF CORRECTION

PATENT NO. : 5,991,428
DATED : November 23, 1999
INVENTOR(S) : Yasuhiro TANIGUCHI It is certified that error appears in the above-identified patent and that said Letters Patent is hereby corrected as shown below:

Claim 1, Col. 9, line 4, "nex" should read --next--.

Signed and Sealed this

Eighth Day of August, 2000

Attest:

Q. TODD DICKINSON

*Attesting Officer*                *Director of Patents and Trademarks*